UNITED STATES PATENT OFFICE.

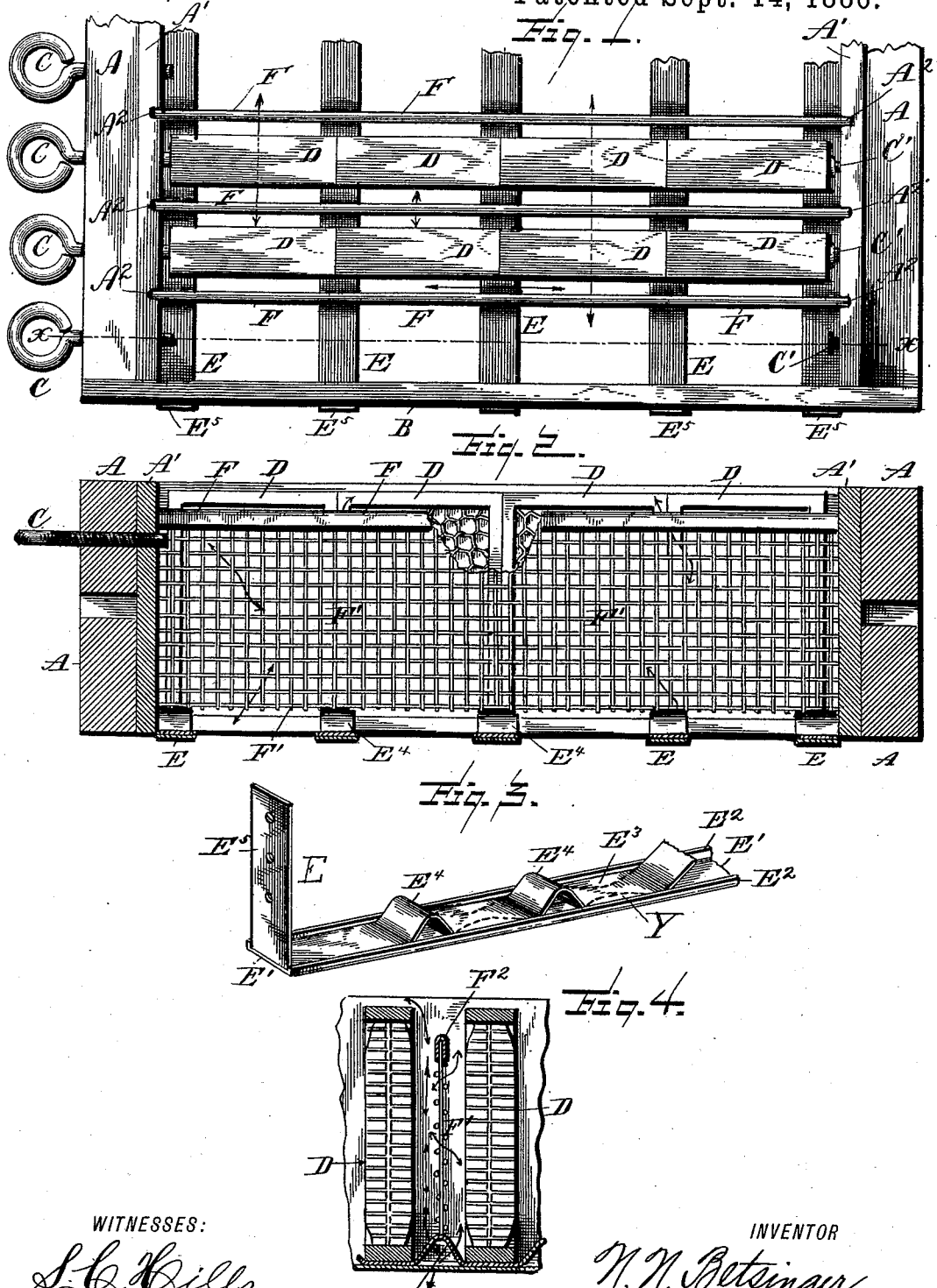

NICHOLAS N. BETSINGER, OF MARCELLUS, NEW YORK.

BEE-HIVE.

SPECIFICATION forming part of Letters Patent No. 349,073, dated September 14, 1886.

Application filed April 16, 1886. Serial No. 199,087. (No model.)

*To all whom it may concern:*

Be it known that I, NICHOLAS N. BETSINGER, a citizen of the United States, residing at Marcellus, in the county of Onondaga, State of New York, have invented certain new and useful Improvements in Bee-Hives, of which the following is a specification, reference being had therein to the accompanying drawings.

This invention has relation to improvements in bee-hives, and among the objects of the invention is to control the bees while at work storing honey in such a manner as to prevent them from obstructing each other, so that time is saved, whereby a certain amount of work will be accomplished in a less time than heretofore, and therefore a certain time may be depended upon as required for the performance of a certain amount of work.

In the present state of the art it is customary to provide removable comb-sections, in order that as fast as filled with honey they may be removed from the hives and replaced by others. The different methods of arranging the comb-sections and of providing access thereto by the bees in their work have, so far as my knowledge of the art extends, overlooked the fact that a colony of bees, by reason of their number and of the comparatively limited area of comb exposed to their use for storing honey, obstruct each other in passing to and fro through the crowded passage-ways, so that a material part of the time actually required to fill the comb is consumed without effective results.

The principle upon which my invention is based is the provision of means which serve to distribute the bees carrying honey to the comb into a systematic arrangement, so that each shall have an unobstructed path to the comb and from the same. The advantages resulting from this method of procedure are that the bees are uniformly distributed over the comb-surface exposed to their use, and therefore the combs are uniformly filled both as to extent and as to time, so that a more marketable product is produced in less time and in a length of time which can be more nearly predetermined than heretofore.

I am aware that perforated partitions have been used in connection with the storage-compartments of bee-hives, and that for ventilating purposes wire-cloth has been employed in and about the hive, and I therefore do not claim either of the above constructions, broadly, as of my invention.

The novel features of my invention, embodying the principles of construction above mentioned, will be hereinafter more fully described, and particularly pointed out in the claims.

Referring to the drawings, Figure 1 represents a plan view of a portion of a section-case constructed in accordance with my invention. Fig. 2 is a vertical transverse section on the line X X of Fig. 1, exposing a separator in front elevation. Fig. 3 is a perspective view of a portion of the comb-section supporting bar or slat. Fig. 4 is a section at right angles to that shown in Fig. 2.

Like letters indicate like parts in all the figures of the drawings.

A represents the end slats, A' the lining at the ends, B the side, C the clamping-screws, and C' the spacing tacks or nails, these parts constituting an ordinary well-known section-case.

D D represents comb-sections, which may be of any usual construction.

E represents my section-supporting slats, each of which consists of two pieces of sheet metal, the one, E', having flanges $E^2$ projecting upwardly at its longer edges, and the other, $E^3$, being bent to form inverted-V-shaped spacing projections $E^4$, and finally bent at right angles to the strip E' at its ends, as at $E^5$, Fig. 1, which ends are secured to the outer surface of the sides B of the case that is at each side thereof.

The linings A' are grooved, as at $A^2$, for the reception and support of my separators F, one of which is arranged between each two rows of comb-sections D. The separator F consists of reticulated wire, each of the meshes F' of which is of a size sufficient to admit the passage of a bee therethrough. The lower edge of the separator is soldered or otherwise secured to the apices of the spacing projections $E^4$ of the section-supporting slats, and the upper edge is provided with a suitable binding, $F^2$, of sheet metal or other material, to prevent laceration of the hands when inserted to remove the comb-sections from between the separators. The strip $E^3$ is soldered or otherwise secured to the strip E'. Instead of soldering these strips together, a small portion of the flanges $E^2$ of the strip $E'$ may be bent inwardly over and down upon the bent strip $E^3$, between the spacing projections, as indicated by dotted lines Y, Fig. 3.

This being the construction, the operation of the invention is as follows: When comb-sections are stored within a hive, as shown and described herein, whether in the brooding or storage chamber, it will be seen that the bees have access to all of the comb-sections from all directions—that is to say, they can pass from one comb-section to another in all directions, as indicated by the arrows in Fig. 1, and, furthermore, from the bottom of the series of comb-sections upward and over the same and backward and forward through the separator to either of the comb-sections at each side thereof, as well as along the entire series of comb-sections from end to end of the case, and by passing over and under the same from one section to another in the series from side to side of the case, or even in any diagonal direction within the case. This freedom of passage is secured in part by arranging a series of comb-sections edge to edge in longitudinal lines and spacing the same and inserting in the spaces separators, as clearly shown in Fig. 1. Perfect freedom of movement of the bees is also apparent under, over, and in and out through the separator, as shown by arrows thereon.

In the use of perforated partitions or shields, as heretofore employed, I have observed that the same are unsatisfactory for the reason that the character of the perforation, it being more or less acute at its edges, is not as advantageous as those of reticulated wire. Furthermore, I have observed that bees, when working in the same, very often, if not invariably, build the comb out and attach the same to that surface of the separator which is toward the comb-section and immediately connecting with the aperture or perforation in the separator, and finally closing the honey-cell across the perforation itself, while bees working at the part of such a separator which is not perforated discontinue their work when their backs touch the separator and close their cells at that time, so that the result is irregularity in the depth of cells, and more or less of the cells are firmly connected with the separator, which prevents the extraction of the honey-sections without injury to the comb. Another disadvantage is that more or less of the cells of the comb are unfilled. All of these disadvantages, as proven by actual demonstration, are obviated by the use of my invention, in that a colony of bees in approaching my comb-sections are in a measure controlled and regulated in their approach to the same, and that without material obstruction, by reason of the interposition of my separator, which admits of the free passage of a sufficient number of bees to work in each comb-section, while the surplus of workers pass onward to the next section or series of sections, and thus the work of the entire colony is systematized. The comb-sections are uniformly filled, both as to depth, area, and time required, so that I am enabled to predetermine without examination of the hive about when to remove the comb-sections therefrom and substitute others therefor. This freedom of systematic and controlled movement upon the part of the bees is secured in a measure when the comb-sections are arranged in other forms than that herein shown and described, so that I do not limit my invention to the use of a reticulated separator in connection with a series of comb-sections arranged edge to edge, nor to the use of both in any particular part of the hive.

In the other mechanical respects described herein my invention involves a minimum of expense in the construction of section-cases, and the novel features thereof are as a matter of course applicable to cases other than that shown, and I therefore do not limit my invention to the use of all the novel features herein shown in a single case, but may employ each separately, if desired.

Having described my invention and its operation, what I claim is—

1. A section-case having combined section-supporting slats provided with spacing projections, and with separators mounted upon said spacing projections and within the case, each of which separators is formed of wire-cloth of a mesh permitting the passage of worker-bees therethrough, substantially as specified.

2. A comb-section-supporting slat consisting of a flanged strip, $E'$, and a bent strip, $E^3$, secured within the flanges of the strip $E'$, substantially as specified.

In testimony whereof I affix my signature in presence of two witnesses.

NICHOLAS N. BETSINGER.

Witnesses:
E. B. STOCKING,
WM. S. DUVALL.